United States Patent
Seiler

(10) Patent No.: US 8,762,745 B2
(45) Date of Patent: Jun. 24, 2014

(54) METHOD FOR OPERATION OF A FIELD DEVICE IN A MATCHED-POWER MODE

(75) Inventor: Christian Seiler, Auggen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 780 days.

(21) Appl. No.: 12/733,793

(22) PCT Filed: Aug. 12, 2008

(86) PCT No.: PCT/EP2008/060577
§ 371 (c)(1),
(2), (4) Date: Aug. 17, 2010

(87) PCT Pub. No.: WO2009/040191
PCT Pub. Date: Apr. 2, 2009

(65) Prior Publication Data
US 2010/0306567 A1    Dec. 2, 2010

(30) Foreign Application Priority Data

Sep. 25, 2007   (DE) .......................... 10 2007 045 884

(51) Int. Cl.
*G06F 1/26*   (2006.01)
*G06F 1/32*   (2006.01)

(52) U.S. Cl.
USPC ............................. 713/300; 713/320; 713/323

(58) Field of Classification Search
CPC .............. G01D 9/005; G05B 19/4185; G05B 2219/31121; G05B 2219/31135; G05B 2219/31162; G05B 2219/33192; G05B 2219/34313; G05B 2219/34315; G06F 1/26; G06F 1/266; G06F 1/32; G06F 1/3209; G06F 1/3296

See application file for complete search history.

(56) References Cited

U.S. PATENT DOCUMENTS

| | | | |
|---|---|---|---|
| 2004/0078117 A1 | 4/2004 | Vanderah | |
| 2006/0092039 A1 | 5/2006 | Saito | |
| 2006/0116102 A1 * | 6/2006 | Brown et al. | 455/343.1 |
| 2007/0038390 A1 * | 2/2007 | Mansfield | 702/45 |
| 2007/0243830 A1 * | 10/2007 | Isenmann et al. | 455/67.11 |
| 2008/0299915 A1 * | 12/2008 | Fink | 455/90.1 |

FOREIGN PATENT DOCUMENTS

| | | |
|---|---|---|
| DE | 10 2006 009 979 A1 | 9/2007 |
| EP | 1 293 853 A1 | 3/2003 |
| WO | WO 2005/040735 A1 | 5/2005 |
| WO | WO 2005/103851 A1 | 11/2005 |
| WO | WO 2005/116787 A1 | 12/2005 |

OTHER PUBLICATIONS

English translation of the IPR, Apr. 29, 2010, WIPO, Geneva, Switzerland.

* cited by examiner

*Primary Examiner* — Dennis M Butler
(74) *Attorney, Agent, or Firm* — Bacon + Thomas, PLLC

(57) ABSTRACT

A method for operating a field device of process automation technology, wherein the field device features a fieldbus communication interface, to which a wireless adapter is connected. The field device can be supplied with electrical power by the wireless adapter via the fieldbus communication interface; and an electrical current flowing over the fieldbus communication interface is not limited, so that it can freely adjust corresponding to a respective power requirement.

18 Claims, 5 Drawing Sheets

METHOD FOR OPERATION OF A FIELD DEVICE IN A MATCHED-POWER MODE

TECHNICAL FIELD

Figure 1:
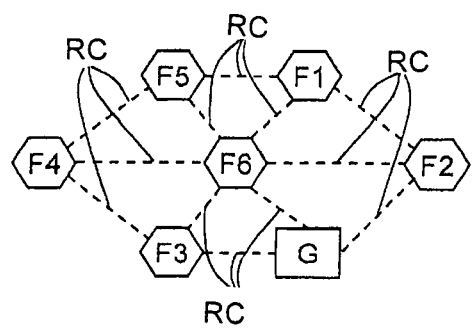

The present invention relates to a method for operating a field device of process automation technology as well as to a field device of process automation technology.

BACKGROUND DISCUSSION

In process automation technology, field devices are often employed, which serve to register and/or influence process variables. For registering process variables, sensors are used, for example, fill-level measuring devices, flow measuring devices, pressure and temperature measuring devices, pH-redox potential measuring devices, electrical conductivity measuring devices, etc., which register the corresponding process variables fill-level, flow, pressure, temperature, pH-value and conductivity. For influencing process variables, actuators are used, for example valves or pumps, via which the flow of a fluid in a section of pipeline or the fill-level in a container can be changed. In principle, all devices, which are employed near to a process and which deliver or work with process-relevant information, are referred to as field devices. A large number of such devices are produced and sold by the Endress+Hauser Group.

In modern industrial facilities, field devices are, as a rule, connected with superordinated units via fieldbus systems (Profibus®, Foundation® Fieldbus, HART®, etc.). Normally, the superordinated units involve control systems or control units, for example a PLC (programmable logic controller). The superordinated units are used, for example, for process control, process visualizing, process monitoring, as well as in the start-up of the field devices. The measurement values registered by the field devices—especially by sensors—are transmitted via the respective bus system to one, or, in given cases, more, superordinated units. Additionally, a transfer of data from the superordinated unit to the field devices via the bus system is necessary, especially for configuring and parametering field devices, as well as for operating actuators.

In addition to a hardwired data transmission between the field devices and the superordinated unit, the possibility of a wireless data transmission also exists. In particular, in the bus systems Profibus®, Foundation® Fieldbus and HART®, a wireless data transmission via radio is specified. Additionally, radio networks for sensors are specified in greater detail in the standard IEEE 802.15.4. For implementing such a wireless transmission of data, newer field devices are in part embodied as radio field devices.

Along with this, there exists the possibility of upgrading field devices without radio units to radio-field devices through the attachment of a wireless adapter featuring a radio unit. The wireless adapter is, in such case, connected to the relevant field device via a fieldbus communication interface of the field device. Via the fieldbus communication interface, the field device can send the data to be transmitted over the bus system to the wireless adapter, which then transmits this via radio to the target location. Conversely, the wireless adapter can receive data via radio and forward such via the fieldbus communication interface to the field device. For example, a wireless adapter by which a conventional field device can be upgraded to a radio field device is described in the publication WO 2005/103851 A1.

Conventional field devices are, as a rule, supplied with electrical power via the bus system, or via lines separately provided for this. If the field device is supplied with energy via the fieldbus, these field devices are then referred to as bus-fed, or two-conductor, devices. In this case, both communication as well as the supplying of energy occurs via a shared 2-conductor-connection. If, in addition to the fieldbus, an additional 2-conductor connection is provided for supplying electrical power, these field devices are then referred to as 4-conductor devices. In the case of the bus-fed field devices, it is especially required that, when they are upgraded to radio field devices through the connection of a wireless adapter, they be supplied with electrical power by the wireless adapter via the fieldbus communication interface. For this purpose, the wireless adapter as a rule includes an electrical current source, for example a disposable battery, a fuel cell, a rechargeable battery, etc. As a rule, two power supply stages are provided in the wireless adapter, wherein a first power supply stage serves to internally supply the system components of the adapter with power, and the second power supply stage serves to externally supply the system components of the field device with power. Both power supply stages are constantly connected to the electrical current source. A power supply stage which serves to the supply the system components of the field device with electrical power is, as a rule, also provided in the field device. The power supply stage of the field device is, in such case, constantly connected to the fieldbus communication interface, and through this, is supplied with electrical power by the wireless adapter.

Since, in the case of such bus-fed field devices, both communication and the supplying of electrical power occurs via the fieldbus communication interface of the field device, corresponding limitations become evident in the case of supplying electrical power. If, for example, the communication interface of the of the field device is constructed according to the HART® bus system—and communication between the field device and the wireless adapter occurs according to the HART® standard—a measured value is transmitted, in an analog manner, by the absolute value of the electrical current. In the case of communication over the fieldbus communication interface, depending on the measured value transmitted, the electrical current value is set to a value between 4 mA and 20 mA (in the following: "Analog measured value transmission according to the 4-20 mA HART® Standard"). In order to assure that the field device is sufficiently supplied with electrical power even in the case of a minimum electrical current value of 4 mA, the voltage is transformed to a correspondingly high value in the second power supply stage of the wireless adapter. In the power supply stage of the field device, the voltage must then once again be transformed to a value corresponding to a voltage required by the individual system components of the field device. A similar problem also becomes evident in the case of the bus systems Profibus® and Foundation® Fieldbus, in the case of which the electrical current flowing over the communication interface is likewise limited.

Through this voltage transformation in the wireless adapter and field device, considerable energy losses are caused. Additionally, a minimum value of electrical power—which is determined by the minimum electrical current value of 4 mA and the voltage which is supplied by the second power supply stage—is delivered by the second power supply stage to the field device. Even if the power requirement of the field device is lower—as is, for example, the case, when a measured value is not recorded by the field device (sensor), when no action is performed by the field device (actuator) or when the field device is in standby mode—the minimum value of electrical power delivered to the field device is nevertheless consumed. In order to lengthen the lifespan of the energy source of the wireless adapter—and thereby also the maintenance intervals—the power consumption of the system (composed of the wireless adapter and the field device) must be reduced. In part for this reason, the field device is shut off during the times when it is not required. This procedure has the disadvantage that the field device runs through a startup mode each time it is turned on for recording a measured value or for performing an action. In such a startup mode, for example, self-checks are performed, capacitors charged, etc. In this way, additional energy is again consumed. A time delay furthermore results thereby.

SUMMARY OF THE INVENTION

On the basis of these considerations, an object of the present invention lies in providing a method for operating a field device which is supplied with electrical power via a wireless adapter, as well as in providing a field device, by which an energy-saving operation of the field device is made possible.

The object is achieved through a method, as well as through a field device.

According to the present invention, a method is provided for operating a field device of automation technology having a fieldbus communication interface, to which a wireless adapter is connected. The field device can be supplied with electrical power from the wireless adapter, via the fieldbus communication interface. For implementing a power-matched and thus energy-saving mode, an electrical current flowing over the fieldbus communication interface is not limited, so that it can freely adjust corresponding to a power requirement.

In such a case, that interface of the field device which serves to connect the field device to the respective field bus (e.g. HART® bus system) is referred to as a field bus communication interface. In such a case, the field bus communication interface can be embodied in the field device according to the respective bus standard. A modification for implementation of the method of the invention is not required. A radio module, which can be connected (preferably releasably) to the field device, and which implements a wireless signal and data transmission for the field device, is referred to as a wireless adapter.

Because the electrical current flowing over the fieldbus communication interface is not limited, it can be adjusted according to the power requirement. If, for example, no measurement or action is currently being performed by the field device, the electrical current value can then be adjusted to a few μA, and thereby to below the minimal electrical current value provided for according to the standard of the respective bus system (e.g. 4 mA in the case of HART®). In this way, an energy-saving standby mode can be implemented. It is thereby no longer required that the field device be turned off at times. If, conversely, a high electrical power is required, the electrical current value can then be adjusted to a higher value than the maximum current value provided according to the standard of the respective bus system (e.g. 20 mA in the case of HART®). In this way, it is no longer required that the voltage for transmission of the electrical power over the fieldbus communication interface be transformed to such a high value.

The power requirement, which determines the electrical current flow over the fieldbus communication interface, is decisively determined by the power requirement of the field device. Especially when the field device records a measurement or an action is performed, the power requirement is strongly increased. Depending on circuit technical implementation, this power requirement can also (as a rule, to a lesser degree) be co-determined by system components of the wireless adapter. Through the feature, that the electrical current can freely be adjusted according to a particular power requirement, it is furthermore not excluded, that a fuse or yet another circuit is provided, which prevents a maximal electrical current value from being exceeded (for example in the case of a short-circuit).

In the power-matched mode, a communication between the wireless adapter and the field device can furthermore be implemented, which, for example, according to the respective bus system, is implemented by a superpositioning of digital communication signals on the electrical current signal. Preferably, the fieldbus communication interface (of the field device), as well as an interface of the wireless adapter connected therewith, are embodied as 2-conductor interfaces of the particular bus system. Preferably, communication occurs according to the Profibus® standard, the Foundation® Fieldbus standard or the HART® standard. In an advantageous further development of the invention, communication occurs via the fieldbus communication interface according to the HART® standard. Since, in a power-matched mode according to the invention, the absolute value of the electrical current signal is no longer set, but instead determined by the respective power requirement, data, especially measured values to be transmitted, are, in this mode, exclusively communicated by a communication signal (according to the HART® standard) superimposed onto the electrical current signal. Preferably, the FSK (Frequency Shift Keying) standard is applied.

In an advantageous further development, at least one system component of the field device (and/or the wireless adapter)—especially a measured value transducer (or a sensor) of the field device—is isolated from the power supply during a time interval, when such system component is not required. This can, for example, be implemented by a circuit operated by the control unit of the field device and/or the wireless adapter. In this way, system components, which are temporarily not required, do not unnecessarily consume electrical power.

In an advantageous further development, the wireless adapter includes a first power supply stage, which is designed for a first power range, and at least a second power supply stage, which is designed for a second power range, wherein the second power range is higher the first power range. Preferably, the field device also includes a first power supply stage of the field device, which is designed for a third power range, and at least a second power supply stage of the field device, which is designed for a fourth power range, wherein the fourth power range is higher than the third power range. The first and the second power ranges, and, respectively, the third and the fourth power ranges, can, in such case, also partially overlap.

In the respective power supply stages, the voltage is, in such a case, transformed to a desired value, in the event that the input voltage of the power supply stage does not correspond to the desired voltage value. Furthermore, control circuits for voltage stabilizing, as well as corresponding circuits for implementing the required protective measures for an Ex-region (explosion hazard area), can be provided in the individual power supply stages. A galvanic isolation can also additionally be implemented through the individual power supply stages, in the event that this is required. One or more of the functions of the power supply stages set forth above is/are matched according to the respective power range for which the individual power supply stages are designed.

Preferably, the respective first power supply stages of the wireless adapter and the field device—or the respective second power supply stages of the wireless adapter and the field device—are connected with each other via the fieldbus communication interface. For this purpose, the field device and/or the wireless adapter can, in each case, exhibit a power switch driven by a control unit (e.g. a CPU) of the field device or of the wireless adapter; wherein the first and the second power supply stages are in each case connectable with the fieldbus communication interface via the power switch in question.

In an advantageous further development, at least those system components of the adapter which have a low power requirement—especially a control unit (e.g. a CPU), a circuit through which a communication with the field device is implemented, and/or a radio unit—are supplied with electrical power through the first power supply stage of the adapter. Preferably, at least those system components of the field device which have a low power requirement—especially a control unit and/or a circuit through which a communication with the wireless adapter is implemented—are supplied with electrical power by the first power supply stage of the field device. It can furthermore be provided that, when the second power supply stages of the field device and the wireless adapter are connected with each other via the fieldbus communication interface, the first power supply stage of the adapter is also additionally connected with an electrical current source of the adapter, and/or that the first power supply stage of the field device is connected with the fieldbus communication interface. In this way, these first power supply stages are, in each case, supplied with electrical power either directly from the electrical current source, or via the fieldbus communication interface. Alternatively, it can be provided that the first power supply stage of the adapter is supplied with electrical power by the second power supply stage of the adapter, and/or that the first power supply stage of the field device is supplied with electrical power by the second power supply stage of the field device.

In an advantageous further development, the first power supply stage of the field device and/or of the wireless adapter exhibits an output voltage which is lower than the output voltage of the respective second power supply stage of the field device and/or of the wireless adapter. For example, the output voltage(s) of the first power supply stage(s) can lie in a range of 1.7 V to 5 V (preferably in a range of 1.7 V to 3.5 V), and the output voltage(s) of the second power supply stage(s) can lie in a range of 8 V to 22 V. In such a case, for reasons of saving energy, low output voltages for the first and second power supply stages are generally preferred, as, in the case of low voltage values, power consumption of the system components is smaller. It can additionally be provided that the output voltages of one or both of the first power supply stages and/or one or both of the second power supply stages are adjustable. Furthermore, it can be provided that the output voltage of the first power supply stage of the field device and/or of the wireless adapter, and the output voltage of the associated second power supply stage of the field device and/or of the wireless adapter are essentially equally high, and that the first and the second power supply stages are, in each case, designed for a differently high, electrical current range.

In an advantageous further development, the field device and the wireless adapter can, as an alternative to the power-matched mode explained above, also be operated in a standard-mode, in which the electrical current flowing over the fieldbus communication interface is set to a predetermined value, especially to a measured value to be transmitted analogly via the fieldbus communication interface according to the HART® standard; wherein the setting of the electrical current is preferably implemented through a corresponding electrical current adjusting circuit in the field device. The electrical current adjusting circuit is preferably operated by a control unit of the field device.

In an advantageous further development, communication occurs between the wireless adapter and the field device via the fieldbus communication interface, by correspondingly specified commands—especially by correspondingly specified HART® commands—concerning in which mode the field device and the wireless adapter are to operate. Preferably, switching between the respective modes is controlled by a control unit provided in the field device and/or by a control unit provided in the wireless adapter. Preferably, the switching occurs as a function of whether a measured value is recorded or an action is executed by the field device at the relevant point in time, or whether the field device is in a standby mode at the relevant point in time. Additionally, it can also be provided that toggling between the power-matched mode with a high power requirement and the power-matched mode with a low power requirement occurs automatically without explicit request by the wireless adapter, —for example, always when a measured value is requested via the fieldbus communication interface of the field device.

In the present invention, a field device of process automation technology is also provided, which has a fieldbus communication interface, as well as an electrical current adjusting circuit, through which an electrical current flowing over the fieldbus communication interface can be set to a predetermined value, especially to a measured value to be transmitted analogly via the fieldbus communication interface according to the HART® standard. The field device can, in such case, be switched to a power-matched mode, in which the electrical current flowing over the fieldbus communication interface is not set by the electrical current adjusting circuit. Alternatively, it can be provided that the field device is constructed in such a manner that it does not include an electrical current adjusting circuit, and is permanently operated in the power-matched mode. On the basis of these considerations, the advantages explained above with regard to the method of the invention can, in the case of this field device, be achieved when it is supplied with electrical power via the fieldbus communication interface by a wireless adapter connected to it. Additionally, the above named further developments and variants and those set forth in the dependent claims can, in corresponding manner, also be implemented in the case of the field device according to the invention, and especially in the case of a radio system including such a field device and a wireless adapter connected thereto. The individual steps and features of the method can, in each case, be implemented by corresponding circuits.

BRIEF DESCRIPTIONS OF THE DRAWINGS

Figure 2A:
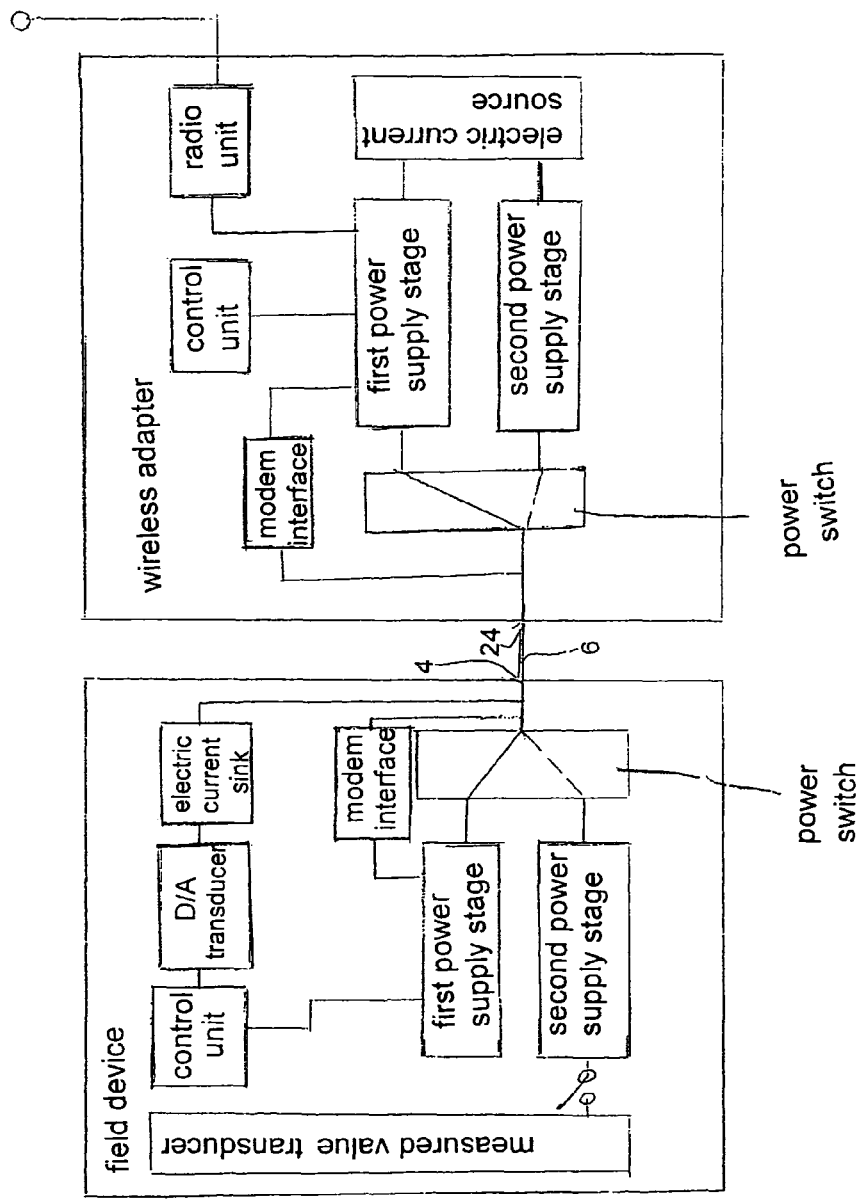
Figure 2B:
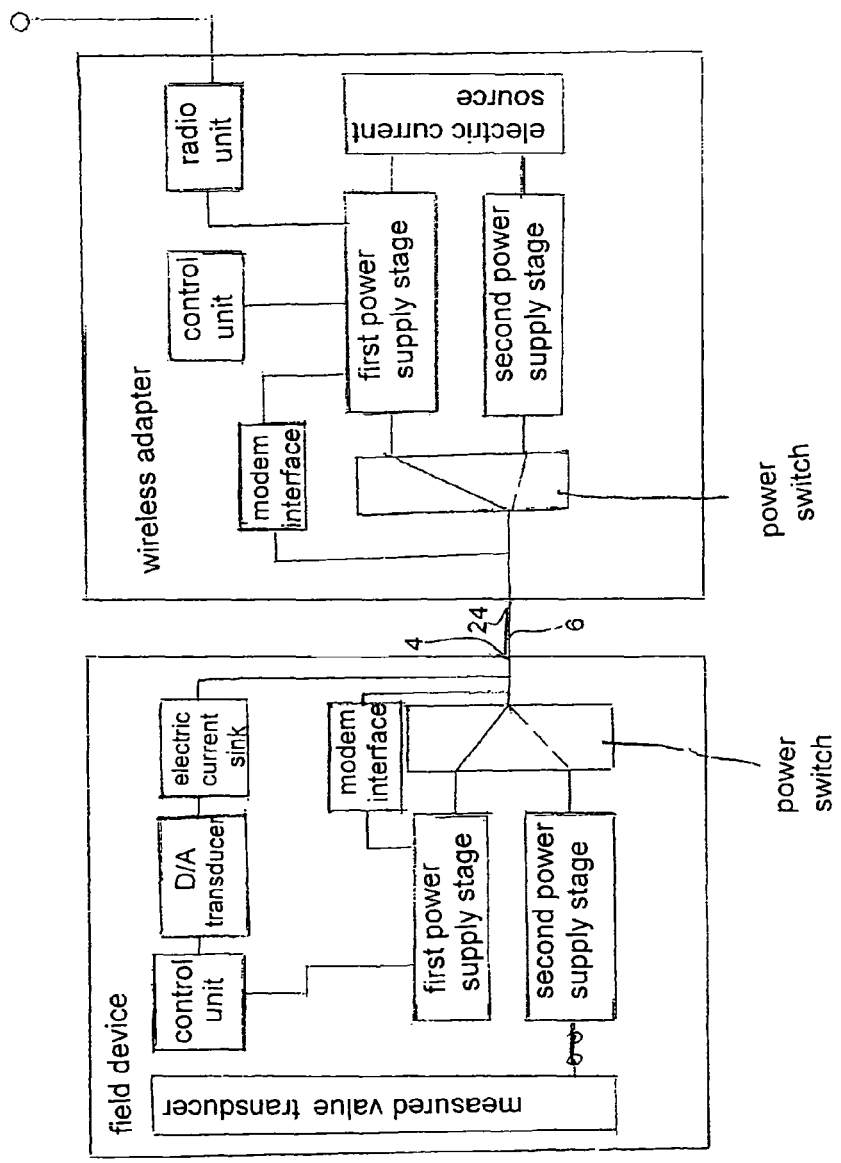
Figure 3A:
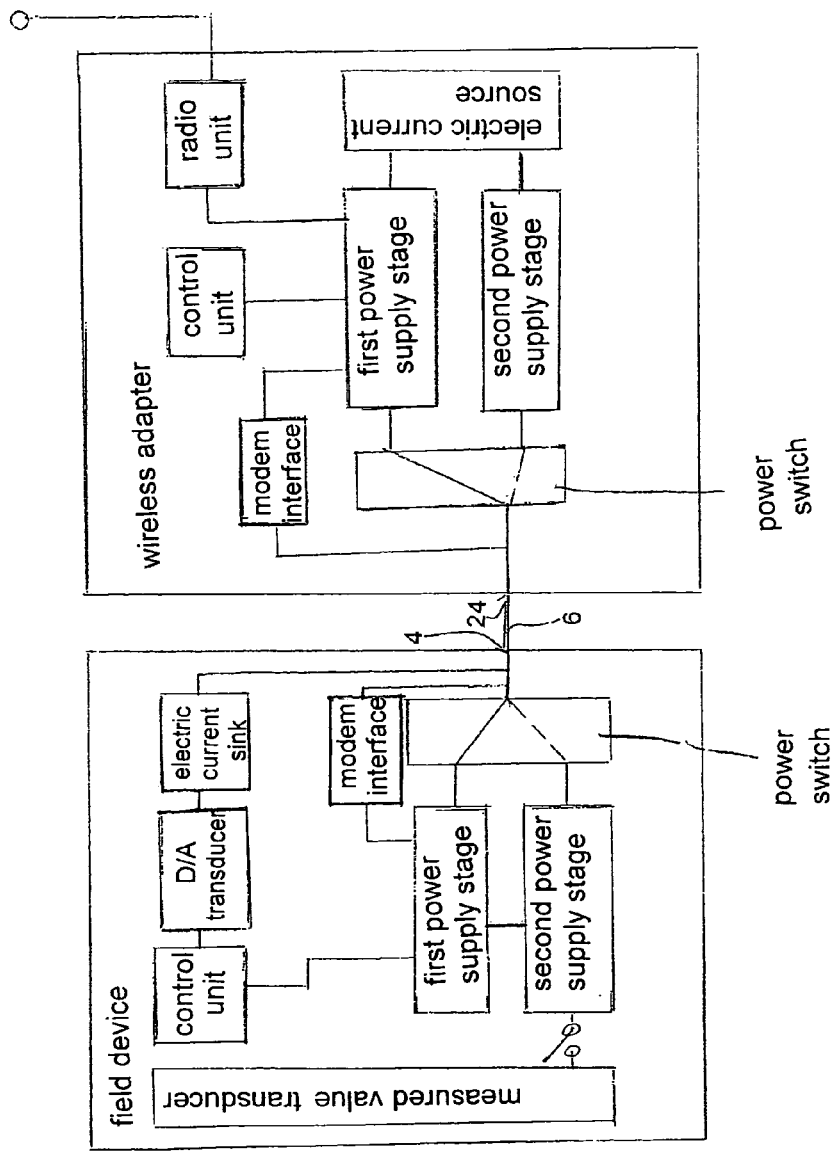
Figure 3B:
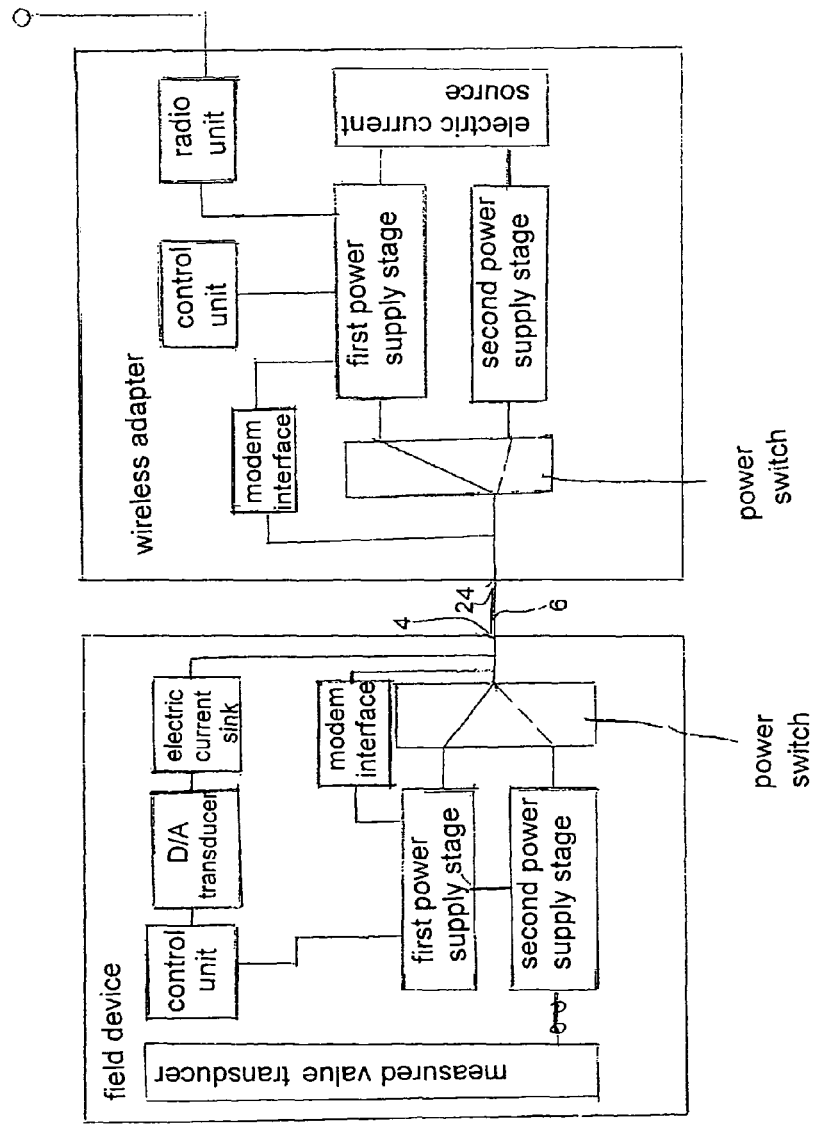

Other advantages and utilities of the invention will become evident on the basis of the following descriptions of examples of embodiments with reference to the appended drawing, the figures of which show as follows:

FIG. 1 is a schematic representation of a wireless network having a plurality of field devices;

FIG. 2 is a block diagram of a field device and a connected wireless adapter according to a first form of embodiment; wherein FIG. 2A shows the switch state in a power-matched mode having a low power requirement, and FIG. 2B shows the switch state in a power-matched mode having a high power requirement; and FIG. 3 is a block diagram of a field device and a connected wireless adapter according to a second form of embodiment; wherein FIG. 3A shows the switch state in a power-matched mode having a low power requirement, and FIG. 3B shows the switch state in a power-matched mode having a high power requirement.

DETAILED DISCUSSION IN CONJUNCTION WITH THE DRAWINGS

FIG. 1 shows a radio network having a plurality of field devices F1, F2, ..., F6 (which are embodied as radio-field devices) and a gateway G. Field devices F1, F2, ..., F6 are, as represented by the dashed lines, in radio connection RC with one another and with the gateway G. Since the field devices F1, F2, ..., F6 and the gateway are each connected via a plurality of radio connections RC, even in the case of a failure of one of the radio connections RC, communication is in this way maintained via one of the other radio connections RC. Suitable radio transmission technologies for the radio connections RC include, for example, frequency hopping spread spectrum (FHSS), and direct sequence spread spectrum (DSSS), methods. Due to the required low transmission powers, ultra wide band technology (UWB) is also very well-suited. The gateway G can be a long distance transmission unit, e.g. the product "Fieldgate" of the firm, Endress+Hauser. In this case, gateway G can communicate worldwide with a superordinated unit, for example via the Internet, GSM or the public switched telephone network.

FIGS. 2A and 2B show a field device 2 having a fieldbus communication interface 4. A wireless adapter 8 is releasably connected to the fieldbus communication interface 4 via a two-wire line 6. The wireless adapter 8 includes a control unit 10 (which, for example, can be embodied as a CPU or microcontroller), a radio unit 12 (which includes an RF-chipset and an antenna 14), as well as an electrical current source 16 in the form a disposable battery. A first power supply stage 18 of the adapter (which is designed for a first, low power range), and a second power supply stage 20 of the adapter (which is designed for a second, higher power range) are connected to the electrical current source 16. Via a power switch 22, the first power supply stage 18 of the adapter or the second power supply stage 20 of the adapter can be selectively connected with the fieldbus communication interface 4 of the field device 2. Though connection of the wireless adapter 8, the field device 2 is upgraded to a radio-field device, such that it can be, for example, one of the field devices F1, F2, ..., F6 of FIG. 1.

The fieldbus communication interface 4 (of the field device 2) and a corresponding interface 24 of the wireless adapter 8 are constructed according to the HART® bus system, and data transmission between the field device 2 and the wireless adapter 8 correspondingly occurs according to the HART® standard. Due to its low transmission speed, the HART® bus system is especially well-suited for use in wireless networks. For superpositioning of the electrical current signal (which is transmitted via the two-wire line 6 to the field device 2) with a digital communication signal (according to the HART® standard), a HART® modem interface 26 is provided in the wireless adapter 8. The HART® modem interface 26, the power switch 22, the second power supply stage 20 of the adapter and the radio unit 12 are controlled by the control unit 10 via control lines (not shown).

Field device 2 is embodied as sensor and accordingly includes a measured value transducer 28. Similarly to the wireless adapter 8, the field device 2 also includes a control unit 30, as well as a HART® modem interface 32. Additionally, the field device 2 includes a first power supply stage 34 of the field device, which is designed for a third, lower power range, and a second power supply stage 36 of the field device, which is designed for a fourth, higher power range. Via a power switch 38, the first power supply stage 34 of the field device alone, or the first power supply stage 34 of the field device together with the second power supply stage 36 of the field device can selectively be connected with the fieldbus communication interface 4. The measured value transducer 28 forwards a registered measured value to the control unit 30 via a signal line (not shown). In order to transmit the registered measured value as an analog electrical current signal (according to the HART® standard) to the wireless adapter 8 via the two-wire line 6, a D/A-transducer 40—which is operated by the control unit 30 via a control line 42—as well as an electrical current sink 44 (operated by the D/A-transducer 40)—which is embodied as a circuit for adjusting or limiting of an electrical current conveyed via the two-wire line 6—are provided in the field device 2. As is generally known in the case of data transmission according to the HART® standard, an electrical current value transmitted via the two-wire line 4 is set or limited by the electrical current sink 44 to a value between 4 mA and 20 mA, according to the measured value registered. In addition to the D/A-transducer 40, the HART® modem interface 32, the power switch 38 and the second power supply stage 36 of the field device are also controlled by the control unit 40 via control lines (not shown).

The third power range of the first power supply stage 34 of the field device is, in such case, chosen in such a way, that the system components the field device 2 which have a low power requirement can be supplied with electrical power via the first power supply stage 34 of the field device. In the present example of an embodiment, these components are, for example, the control unit 30 and the HART® modem interface 32. Depending on the particular implementation of the field device 2, still other system components may be added to these. Additionally, the measured value transducer 28 is connected with the second power supply stage 36 of the field device via a switch 46 (which can be operated via a control line (not shown) of the control unit 30), so that, in the case of a closed switch 46, the measured value transducer 28 can be supplied with electrical power by the second power supply stage 36 of the field device. The fourth power range of the second power supply stage 36 of the field device is, in such case, chosen in such a way, that the measured value transducer 28—which, as a rule, has a considerably higher power requirement during use than the other system components of the field device 2 (and of the wireless adapter 8)—can be supplied with electrical power via the second power supply stage 36.

Additionally, the first power range of the first power supply stage 18 of the adapter is chosen in such a way, that the system components of the adapter 8 which have a low power requirement—as well as the first power supply stage 34 of the field device (and thus the system components 30, 32 the field device 2, which have a low power requirement)—can be supplied with electrical power via the first power supply stage 18 of the adapter. Additionally, the second power range of the second power supply stage 20 of the adapter is chosen in such a way, that both the first 34 as well as the second 36 power supply stage of the field device can together be supplied with electrical power by the second power supply stage 20 of the adapter.

In the present example of an embodiment, for example, the control units 30 and 10, the HART® modem interfaces 32 and 26 as well as the radio unit 12 are, in each case, operated at 3 V. Accordingly, an output voltage of 3 V is provided in each case by the first power supply stages 18 and 34. In the present example of an embodiment, the output voltage provided by the electrical current source 16 amounts to 3.6 V, so that a transformation of 3.6 V to 3.0 V is performed in the first power supply stage 18 of the adapter. Measured value transducers are, as a rule, operated at a voltage in the range of 10 V to 20 V. The measured value transducer 28 in the present example of an embodiment is operated at 15 V. Accordingly, the second power supply stage 36 of the field device supplies a voltage of 15 V. Preferably, the voltage is already transformed to this value in the second power supply stage 20 of the adapter, so that no voltage transformation is required in the second power supply stage 36 of the field device. In such a case, the electrical current requirement of the system components listed above varies depending on load.

The switching into one of the power-matched modes, as well as the switching into the standard HART® mode can, in such a case, both be requested by the field device 2 through the wireless adapter 8, as well as vice versa. The request for switching occurs, in such a case, according to the HART® standard; wherein particular HART® commands, which are superimposed on the electrical current signal as digital communication signals, are specified for this purpose. For example, the wireless adapter 8 can, through transmission of a corresponding HART®-command, request that the field device 2 switch to the power-matched mode for a low power requirement. Following this, the field device 2 gives up its standard 4-20 mA function, which means that the outgoing communication of the field device 2 occurs exclusively through superpositioning of digital communication signals onto the electrical current signal, as is specified in the HART® standard (FSK-method). For this purpose, the electrical current sink 44 of the field device 2 is operated or shunted in such a way, that it no longer limits the electrical current flowing over the fieldbus communication interface 4. The absolute electrical current value of the electrical current signal is no longer significant for communication. Additionally, both of the power switches 22 and 38 are operated by the particular control unit 10 or 30 (of the wireless adapter 8 and the field device 2, respectively) in such a manner, that they in each case connect the first power supply stages 18 and 34 with the fieldbus communication interface 4. The second power supply stages 20 and 36 are then, in each case, isolated from the fieldbus communication interface 4. Additionally, switch 46 is open. This switch position is shown in FIG. 2A. In this power-matched mode with a low power requirement, the field device 2 can, for example, be operated in a standby mode. Since the electrical current value, which is fed to the field device 2 via the fieldbus communication interface 4, is not limited to a minimum value of 4 mA, it can sink to a considerably lower value (for example, to a few μA). In this way, an energy saving standby mode can be implemented. Additionally, the individual, supplied system components can effectively be matched to the electrical current source 16 by both of the first power supply stages 18 and 34, whereby energy is saved.

If the wireless adapter 8 receives a request (for example, from a superordinated unit) for a measured value via the radio unit 12, the wireless adapter 8 asks the field device 2 to switch to the power-matched mode with a high power requirement. In such a case, the electrical current sink 44 of the field device 2 is then operated or shunted in such a manner, that the electrical current which flows over the fieldbus communication interface 4 is not limited. The power switch 22 of the wireless adapter 8 is operated in such a manner, that exclusively the second power supply stage 20 of the adapter communicates with the fieldbus communication interface 4. In such a case, the first power supply stage 18 of the adapter is still connected to the electrical current source 16, and serves to the supply the system components of the adapter 8 with electrical power. Additionally, the power switch 38 of the field device 2 is operated in such a way, that both the first 34 as well as the second 36 power supply stages of the field device are connected with the fieldbus communication interface 4. Additionally, the switch 46 is closed, so that the measured value transducer 28 is supplied with electrical power via the second power supply stage 36 of the field device and via the second power supply stage 20 of the adapter. This switch position is shown in FIG. 2B. The electrical current flowing over the fieldbus communication interface 4 can, in turn, vary, depending on the power requirement. In the power-matched mode for a high power requirement, the high power requirement of the measured value transducer 28 can be matched to the electrical current source 16 by the two second power supply stages 20 and 36, whereby energy is saved. In this switch state, the voltage must be transformed in the first power supply stage 34 of the field device to a value (here 3V) which is required by the system components 30, 32 that are supplied with electrical power by the first power supply stage 34 of the field device. In the power-matched mode with a high power requirement, a measured value (determined in the field device 2) is also communicated to the wireless adapter 8, not via the absolute electrical current value of the electrical current signal, but instead by a superpositioning of digital communication signals onto the electrical current signal, according the HART® standard (FSK-method). After obtaining the measured value, the wireless adapter 8 can again request that the field device 2 switch to the power-matched mode with a low power requirement described above. In this way, energy is not unnecessarily consumed during those times, in which no measured value need be taken.

In addition to the two power-matched modes described above, implementing a standard HART® mode is also possible. The standard HART® mode can, once again, be requested via special HART® commands specified for this purpose. In the standard HART® mode, a switch state is assumed, as is presented in FIG. 2B and described above. Additionally, the electrical current sink 44 is operated via the D/A-transducer 40 of the control unit 30 in such a way, that the electrical current value flowing over the fieldbus communication interface 4 is set to a value which lies between 4 mA and 20 mA, and which, in each case, when a measured value is transmitted, corresponds to the respective registered measured value. Additionally, the two second power supply stages 20 and 36 of the wireless adapter 8 and the field device 2 are operated in such a manner, that the voltage value in the region of the fieldbus communication interface 4 is sufficiently high, that even in the case of a minimum electrical current value of 4 mA, it is assured that the field device 2 is sufficiently supplied with electrical power.

A second form of embodiment of the present invention will now be explained with reference to FIGS. 3A and 3B. In the course of this, equal components are referred to with the equal reference characters. In the following, only differences with respect to the first form of embodiment are explored.

In FIG. 3A, a switch state for a power-matched mode with a low power requirement is again presented, while in FIG. 3B, a switch state for a power-matched mode with a high power requirement is presented. In contrast to the first form of embodiment, in the power-matched mode with a high power requirement, the power switch 38' of the field device 2' exclusively connects the second power supply stage 36 of the field device with the fieldbus communication interface 4. The first power supply stage 34 of the field device is, in the power-matched mode with high power requirement, supplied with electrical power by the second power supply stage 36 of the field device, as is shown in FIGS. 3A and 3B by line 48. On the basis of these considerations, in this second form of embodiment, the fourth power range of the second power supply stage 36 of the field device is designed in such a way, that not only the measured value transducer 28, but also the first power supply stage 34 of the field device, can be supplied with electrical power by the second power supply stage 36 of the field device.

The present invention is not limited to the examples of embodiments illustrated in the figures. For example, more than just two power supply stages can be provided in both the field device as well as in the wireless adapter. These can either be designed for implementing an additional power-matched mode—and accordingly be connectable with the fieldbus communication interface of the field device via a corresponding power switch—or they can be permanently connected to an electrical current supply, and only serve to provide separately a required voltage for a certain system component. The type of connection between the field device and the wireless adapter is also unimportant for the present invention, as long as it makes possible communication, as well as a supplying of electrical current. For example, the interface of the wireless adapter and the fieldbus communication interface of the field device can also be directly connected to each another without a cable connection running between them. Additionally, the voltage values of the individual system components and of the individual power supply stages set forth in the examples of embodiments are only intended as examples. Depending on the implementation of the circuit, a voltage transformation, for example, can also always be performed in the first and/or second power supply stage of the field device.

The invention claimed is:

1. A method for operating a field device of process automation technology, wherein the field device includes a fieldbus communication interface, to which a wireless adapter is connected, comprising the steps of:
   supplying the field device with electrical power by the wireless adapter via the fieldbus communication interface; and
   implementing a communication between the wireless adapter and the field device according to one of the standards Profibus, Foundation Fieldbus or HART by a superpositioning of digital communication signals on an electrical current signal, wherein:
   the field device is switched to a power-matched mode in which the electrical current signal, flowing over the fieldbus communication interfacer can be adjusted to be below a minimal electrical current value provided for according to the standard of the respective bus system.

2. The method as claimed in claim 1, wherein:
   communication over the fieldbus communication interface occurs according to the HART ® standard; and
   measured values to be transmitted, are exclusively communicated through a digital communication signal superimposed on the electrical current signal.

3. The method as claimed in claim 1, wherein:
   a measured value transducer of the field device, forming at least one system component of the field device of the wireless adapter is isolated from the power supply during a time interval, in which such system component is not required.

4. The method as claimed in claim 1, wherein:
   the wireless adapter includes a first power supply stage designed for a power range, and at least a second power supply stage designed for a further power range; and
   said further power range is higher than said power range.

5. The method as claimed in claim 4, wherein:
   said first power supply stage of the field device and/or of the wireless adapter has an output voltage which is lower than the output voltage of the respective second power supply stage of the field device and/or of the wireless adapter;
   the output voltage(s) of said first power supply stage(s) preferably lies(s) in a range of 1.7 V to 5 V, and more preferably in a range of 1.7 V to 3.5 V; and
   the output voltage(s) of said second power supply stage(s) preferably lie(s) in a range of 8 V to 22 V.

6. The method as claimed in claim 4, wherein:
   communication between the wireless adapter and the field device concerning which mode the field device and the wireless adapter are to be operated in occurs via the fieldbus communication interface, through correspondingly specified HART® commands.

7. The method as claimed in claim 6, wherein:
   switching between the respective modes occurs via one of: a control unit provided in the field device and via a control unit provided in the wireless adapter; and
   the switching preferably occurs as a function of whether a measured value is to be recorded or an action is to be executed by the field device at the relevant point in time, or whether the field device is in a standby mode at the relevant point in time.

8. The method as claimed in claim 1, wherein:
   the field device includes a first power supply stage designed for a still further power range, and at least a second power supply stage designed for a an even further power range;
   said even further power range is higher than said still further power range; and
   said first power supply stage of the wireless adapter and the field device, or said second power supply stage of the wireless adapter and the field device, are connected with one another via the fieldbus communication interface.

9. The method as claimed in claim 8, wherein:
   at least those system components of the adapter which have a low power requirement—especially one of: a control unit, a circuit through which communication with the field device is implemented, and a radio unit are supplied with electrical power by said first power supply stage of the adapter; and/or
   at least those system components of the field device which have a low power requirement—especially a control unit and/or a circuit through which communication with the wireless adapter is implemented are supplied with electrical power by the first power supply stage of the field device.

10. The method as claimed in claim 8, wherein:
    when said second power supply stage of the field device and the wireless adapter are connected with one another via the fieldbus communication interface, said first power supply stage of the adapter is also connected with an electrical current source of the adapter; and/or
    said first power supply stage of the field device is connected with the fieldbus communication interface.

11. The method as claimed in claim 8, wherein:
    when said second power supply stage of the field device and the wireless adapter are connected with one another via the fieldbus communication interface, said first power supply stage of the adapter is supplied with electrical power by said second power supply stage of the adapter; and/or said first power supply stage of the field device is supplied with electrical power by said second power supply stage of the field device.

12. The method as claimed in claim 1, wherein:
the field device and the wireless adapter can, alternatively, also be operated in a standard-mode, in which the electrical current flowing over the fieldbus communication interface is set to a measured value to be transmitted analogly over the fieldbus communication interface according to the HART® standard; and
the setting of the electrical current is preferably implemented through a corresponding electrical current adjusting circuit in the field device.

13. A field device of process automation technology comprising:
a fieldbus communication interface; and
an electrical current adjusting circuit, by which an electrical current flowing over the fieldbus communication interface can be set to a predetermined value, to a measured value to be transmitted, analogly, over the fieldbus communication interface wherein the field communication interface is construed according to one of the bus system standards Profibus, Foundation Fieldbus or Hart, wherein:
said field device can be switched to a power-matched mode;
in which the electrical current flowing over the fieldbus communication interface can be adjusted to be below a minimal electrical current value provided for according to the standard of the respective bus system.

14. The field device as claimed in claim 13, wherein:
said field device includes a first power supply stage of said field device, which is designed for a power range, and at least a second power supply stage, which is designed for a further power range, which is higher than said power range of said first power supply stage; and
said first and the second power supply stages of said field device can, in each case, be connected with said fieldbus communication interface.

15. The field device as claimed in claim 14, wherein:
said field device includes a control unit and a power switch controlled by said control unit; and
said first and said second power supply stages of said field device can, in each case, be connected with said fieldbus communication interface through the power switch.

16. A radio system comprising:
a field device as claimed in claim 13, and a wireless adapter, which is connected to said fieldbus communication interface of said field device, and which includes an electrical current source for supplying system components of said wireless adapter and of said field device with electrical power, and which also includes at least one power supply stage and a radio unit.

17. A method for operating a field device of process automation technology, wherein the field device includes a fieldbus communication interface, to which a wireless adapter is connected, comprising the steps of:
supplying the field device with electrical power by the wireless adapter via the fieldbus communication interface;
wherein a communication between the wireless adapter and the field device is implemented according to one of the standards Profibus, Foundation Fieldbus or HART by a superpositioning of digital communication signals on an electrical current signal; and
wherein the field device is switched to a power-matched mode in which the electrical current signal, flowing over the fieldbus communication interface, can be adjusted to be higher than a maximum current value provided for according to the standard of the respective bus system of the application as published is not limited, so that it can freely adjust corresponding to a power requirement of the field device.

18. A field device of process automation technology, comprising:
a fieldbus communication interface; and
an electrical current adjusting circuit, by which an electrical current flowing over the fieldbus communication interface can be set to a predetermined value, such as to a measured value to be transmitted, analogly, over the fieldbus communication interface wherein the field communication interface is construed according to one of the bus system standards Profibus, Foundation Fieldbus or HART, wherein:
said field device can be switched to a power-matched mode, in which the electrical current flowing over the fieldbus communication interface can be adjusted to be higher than a maximum current value provided for according to the standard of the respective bus system.

* * * * *